Feb. 23, 1926.
H. D. KELLY
COFFEEPOT
Filed August 6, 1923
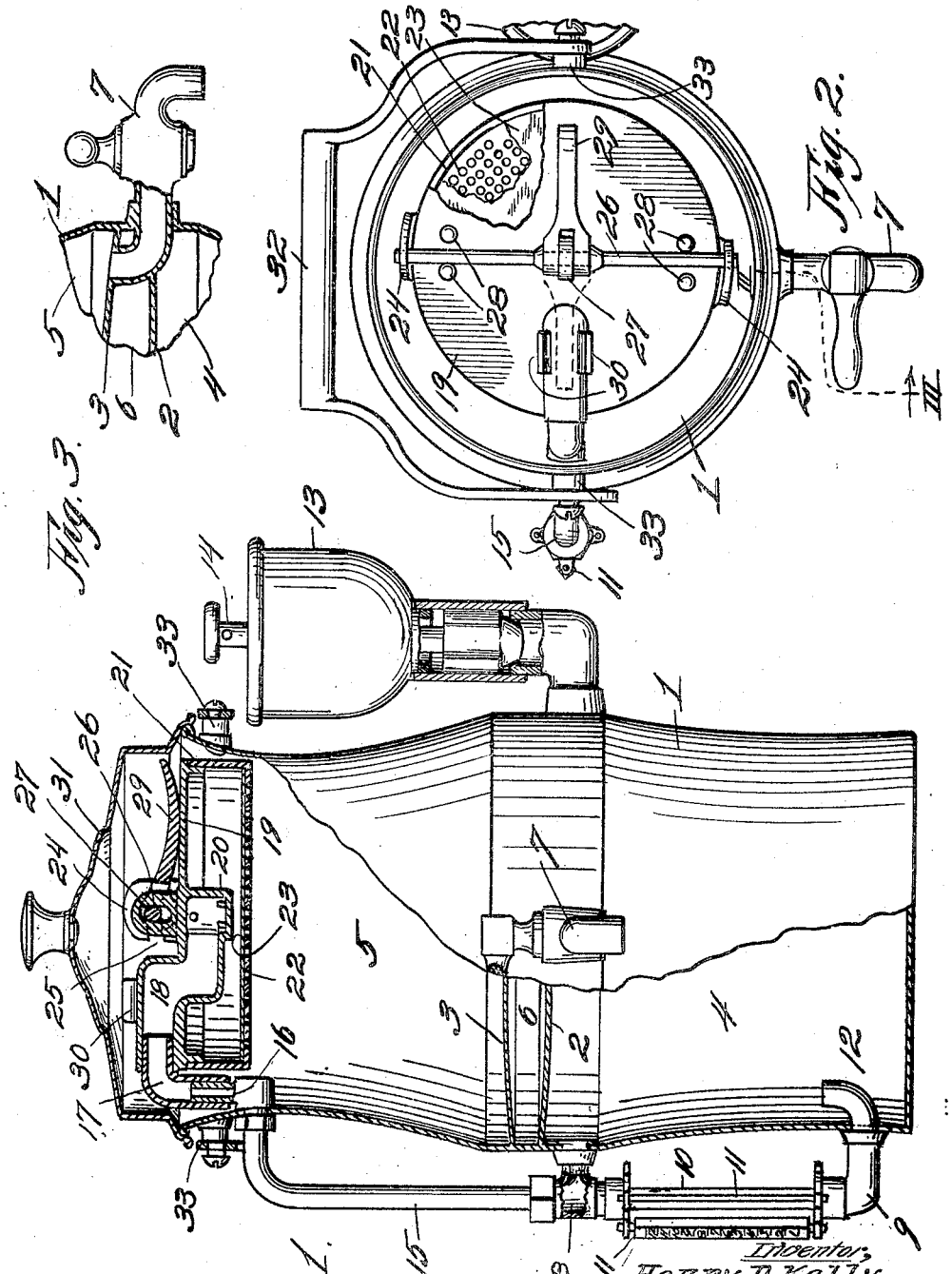

Patented Feb. 23, 1926.

1,574,154

UNITED STATES PATENT OFFICE.

HENRY D. KELLY, OF KANSAS CITY, MISSOURI.

COFFEEPOT.

Application filed August 6, 1923. Serial No. 656,017.

*To all whom it may concern:*

Be it known that I, HENRY D. KELLY, a citizen of the United States, residing at Kansas City, in the county of Jackson and State of Missouri, have invented a certain new and useful Improvement in Coffeepots, of which the following is a complete specification.

This invention relates to coffee pots and my object is to produce coffee pots for home or domestic use of that class wherein the beverage produced shall be forced by the pressure of steam through a filter into the beverage chamber, and which is perfectly safe in operation as regards explosion, by the provision of a relief valve for excess steam pressure.

A still further object is to produce a coffee pot for insuring a beverage of the best quality considering the grade of coffee employed, and in which the quantity in cups, of water supplied to the pot, is visually indicated so that the person in charge will know how many cups of coffee can be made.

Another object is to provide simple, strong, durable, inexpensive and efficient means for locking the ground coffee container cover in place or for unlocking such cover.

With these general objects in view, the invention consists in certain novel and useful features of construction and combinations of parts as hereinafter described and claimed; and in order that it may be fully understood, reference is to be had to the accompanying drawing, in which:

Figure 1 is a side elevation broken away to disclose the interior and showing the ground-coffee container substantially in central vertical section.

Figure 2 is a plan view with the pot lid omitted and the steam-relief elements broken away.

Figure 3 is a fragmental vertical section on the line III—III of Figure 2.

In the said drawing, 1 indicates the pot body of conventional or any desired configuration, and 2 and 3 partitions forming a lower boiler chamber 4, an upper or beverage chamber 5, and an interposed or vacuum chamber 6. A discharge faucet 7, leads from chamber 5 to the exterior of the pot. A T-coupling 8 communicates with the upper part of the boiler chamber, and through pipe-way 9 with the bottom of said chamber, said pipe-way including a water column 10, protected by guard rods 11, one of which contains division marks to indicate how much water, in cup measurement or quantity, is standing in the boiler above the level of the water-discharge elbow 12 forming the lower or receiving end of conduit 9. If no water appears in the water column, the attendant will know replenishment is necessary before coffee can be made, it being understood that the generation of steam in the boiler chamber produces the pressure necessary to circulate water through elbow 12 and the pipe-way 9, to the beverage chamber, as hereinafter appears. To relieve against excess steam pressure and thus guard against explosion, an open casing 13 communicates with the boiler chamber, and is closed against normal steam pressure, by a gravity valve 14. The pressure-relief elements mentioned are conventional and therefore not detailed. Extending upward from the coupling 8, is a pipe-way 15, terminating within the beverage chamber, in an upstanding nipple 16, detachably engaged by the depending arm of an elbow-fitting 17, rigidly secured in a passage 18 of a cover 19, the latter having a centrally-depending, perforated nozzle or spray 20 at the discharge end of passage 18. The cover 19 fits removably upon a shallow ground-coffee container 21, having a perforated bottom 22, normally closed by a filter sheet 23, upon which ground coffee is deposited, and through which the steam forces the boiling water, the liquid coffee or beverage collecting in the chamber 5, from which it is drawn off as desired, through the faucet 7.

The ground-coffee container is provided at diametrically-opposite points with a pair of upstanding ears 24 horizontally slotted at 25 at opposite sides for the reception of the ends of a resilient transverse shaft 26, journaled centrally and having vertical play in a vertically-slotted lug 27 projecting upward from cover 19, and fitted for slight lateral play between pairs of stop-pins 28, rising from the said cover. A bifurcated cam lever 29 is secured on the shaft 26 at opposite sides of the lug 27, and is adapted when swung from the dotted-line position (Figure 2) to the full-line position (Figures 1 and 2) for clamping the cover 19 firmly upon the ground-coffee container. When the lever is in the dotted-line position the cover being unclamped, can be removed after first being rotated enough to withdraw the ends of the shaft from the slotted ears, a reversal of this rotary movement reengaging the shaft with the ears. For convenience in lifting cover 19, it is provided with a pair of grip-lugs 30. The pot lid 31, (omitted from Figure 2) is of conventional type, and the carrying handle is in the form of a bail 32, pivoted to lugs 33 of the pot. The ground-coffee container is removed preliminary to emptying the used grounds and recharging with a fresh supply, as there is no support for the body of the container when the cover thereof is removed.

By opening the yieldingly-closed casing or connection, water can be supplied to the boiler chamber, and the quantity which stands above the elbow 12, is shown by the measure marks on the gage rod, the air venting from the said chamber through the coupling 8 to pipe-way member 15.

From the above description it will be apparent that I have produced a coffee pot of simple, efficient and economical construction by which coffee of a uniform quality and strength can be produced by anyone, and while I have illustrated and described the preferred embodiment of the invention, it will be apparent that it is susceptible of modification in minor particulars without departing from the principle of construction and mode of operation involved.

I claim:

1. A coffee pot provided with boiler and beverage chambers separated by a vacuum chamber, a ground-coffee container in the beverage chamber, having a filter-controlled discharge, a cover secured on the container, provided with a passage having jet orifices to discharge into the container, a pipe-way communicating with the lower part of the boiler chamber and the passage in said cover, a yieldingly-closed relief connection for the boiler chamber; and said chamber having a vent connection at its upper end.

2. A coffee pot provided with boiler and beverage chambers separated by a vacuum chamber, a ground-coffee container in the beverage chamber, having a filter-controlled discharge, a cover secured on the container, provided with a passage having jet orifices to discharge into the container, and a pipe-way communicating with the lower part of the boiler chamber and the passage in said cover and also with a vent leading from the upper part of the boiler chamber.

3. A coffee pot provided with boiler and beverage chambers separated by a vacuum chamber, a ground-coffee container in the beverage chamber, having a filter-controlled discharge, a cover secured on the container, provided with a passage having jet orifices to discharge into the container, a pipe-way communicating with the lower part of the boiler chamber and the passage in said cover and also with a vent leading from the upper part of the boiler chamber, and a yieldingly-closed relief connection for the boiler chamber.

In witness whereof I hereunto affix my signature.

HENRY D. KELLY.